(12) United States Patent
Schwaiger

(10) Patent No.: US 7,513,751 B2
(45) Date of Patent: Apr. 7, 2009

(54) METHOD FOR REGULATING THE VACUUM SUPPLY OF CALIBRATION TOOLS

(75) Inventor: Meinhard Schwaiger, Linz (AT)

(73) Assignee: Technoplast Kunststofftechnik GmbH, Micheldorf (AT)

( * ) Notice: Subject to any disclaimer, the term of this patent is extended or adjusted under 35 U.S.C. 154(b) by 557 days.

(21) Appl. No.: 10/538,834

(22) PCT Filed: Dec. 11, 2003

(86) PCT No.: PCT/AT03/00368

§ 371 (c)(1),
(2), (4) Date: Jan. 5, 2006

(87) PCT Pub. No.: WO2004/053614

PCT Pub. Date: Jun. 24, 2004

(65) Prior Publication Data

US 2006/0159794 A1    Jul. 20, 2006

(30) Foreign Application Priority Data

Dec. 12, 2002  (AT) ............................. GM 838/2002

(51) Int. Cl.
 *F04B 41/06* (2006.01)
 *B28B 5/00* (2006.01)
(52) U.S. Cl. ............................. 417/3; 417/570; 425/71; 425/72.1
(58) Field of Classification Search .................... 62/62, 62/63, 64; 425/71, 72.1; 417/2, 3, 570
 See application file for complete search history.

(56) References Cited

U.S. PATENT DOCUMENTS

| | | | | |
|---|---|---|---|---|
| 3,471,890 A | * | 10/1969 | Ramo | 15/301 |
| 4,000,625 A | * | 1/1977 | Beerens et al. | 62/63 |
| 4,029,452 A | * | 6/1977 | Schippers et al. | 425/71 |
| 4,054,148 A | * | 10/1977 | Gurr | 134/57 R |
| 4,171,193 A | * | 10/1979 | Rahlfs | 425/71 |
| 4,411,613 A | * | 10/1983 | Gauchel et al. | 425/388 |
| 4,530,650 A | * | 7/1985 | Milani | 425/71 |
| 5,008,051 A | * | 4/1991 | DeCoursey et al. | 264/40.3 |
| 5,340,295 A | * | 8/1994 | Preiato et al. | 425/71 |
| 5,373,893 A | * | 12/1994 | Eisenmann et al. | 165/65 |
| 5,505,058 A | * | 4/1996 | Dorninger | 62/374 |
| 5,514,325 A | * | 5/1996 | Purstinger | 264/560 |

(Continued)

FOREIGN PATENT DOCUMENTS

DE   3301556   7/1984

(Continued)

*Primary Examiner*—David A. Rogers
(74) *Attorney, Agent, or Firm*—Dykema Gossett PLLC

(57) ABSTRACT

A method and apparatus for regulating the vacuum supply to calibration tools which include at least one dry calibration tool and at least one calibration bath, wherein at least one vacuum pump is brought into contact with a calibration tool in order to extract air from the calibration tool, the pressure in the tool being regulated to a target value by means of a control valve. Several vacuum pumps extract air from a common pressurized container, and the air is extracted from at least one dry calibration tool by a first control valve in the common pressurized container and in addition the air is extracted from at least one calibration bath by a second control valve in the common pressurized container.

14 Claims, 1 Drawing Sheet

U.S. PATENT DOCUMENTS

| | | |
|---|---|---|
| 5,645,861 A * | 7/1997 | Czarnik et al. ................ 425/71 |
| 5,753,161 A * | 5/1998 | Lightle et al. .............. 264/45.9 |
| 5,944,049 A * | 8/1999 | Beyer et al. .............. 137/487.5 |
| RE36,585 E * | 2/2000 | Purstinger ................... 264/560 |
| 6,244,847 B1 * | 6/2001 | Wegmaier et al. ............. 425/71 |
| 6,419,454 B1 | 7/2002 | Christiansen |
| 7,156,922 B2 * | 1/2007 | Muller et al. ............... 118/715 |
| 2006/0034966 A1 * | 2/2006 | Schwaiger ............... 425/326.1 |
| 2006/0138690 A1 * | 6/2006 | Schwaiger et al. ......... 264/40.6 |
| 2006/0145389 A1 * | 7/2006 | Schwaiger et al. .......... 264/148 |

FOREIGN PATENT DOCUMENTS

| | | |
|---|---|---|
| EP | 0659536 | 6/1995 |
| GB | 2313570 | 12/1997 |
| JP | 05131525 | 5/1993 |

* cited by examiner

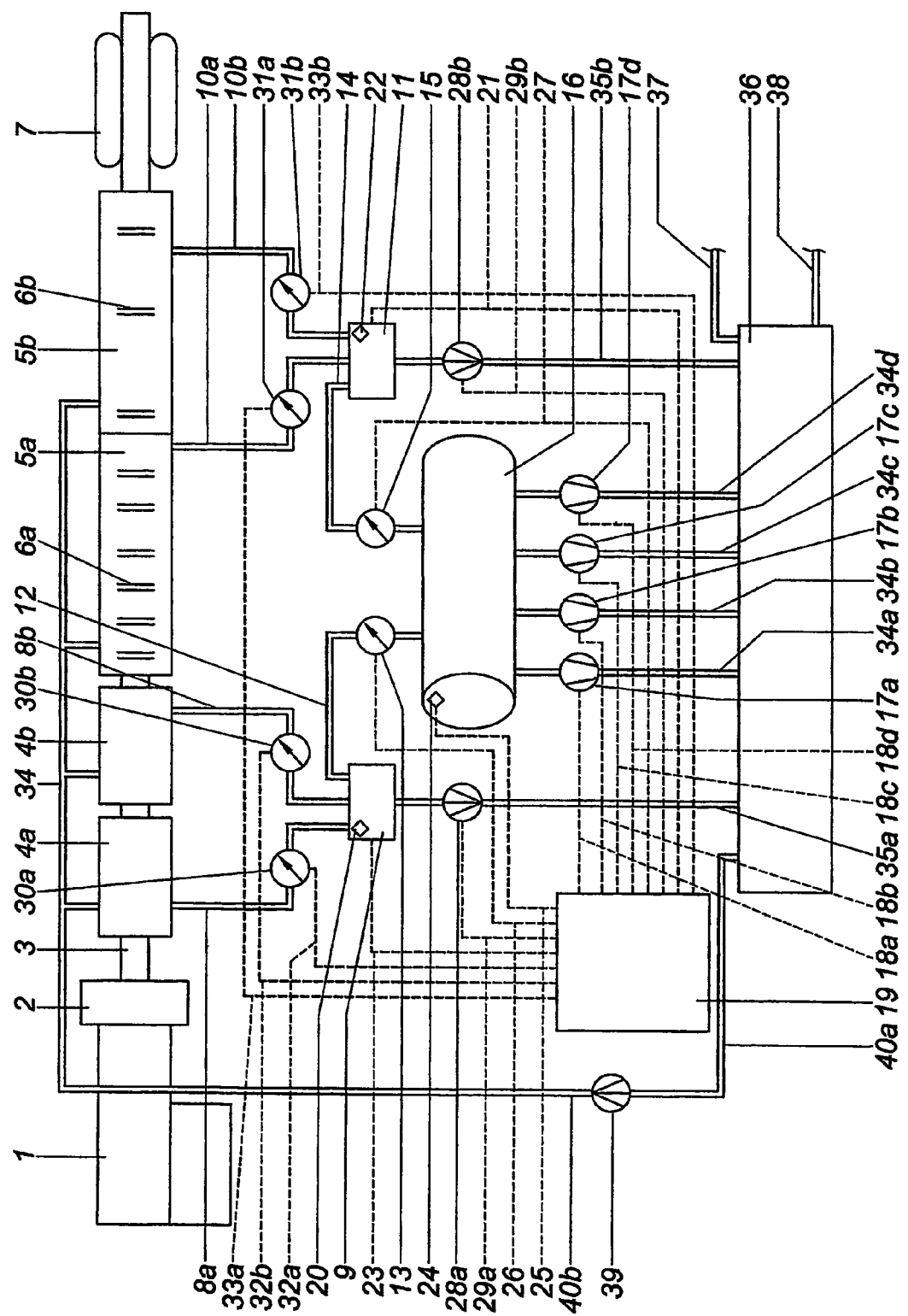

METHOD FOR REGULATING THE VACUUM SUPPLY OF CALIBRATION TOOLS

BACKGROUND OF THE INVENTION

1. Field of the Invention

The invention relates to a method for regulating the vacuum supply of calibration tools, the tools including at least one dry calibration tool and at least one calibration bath, by which at least one vacuum pump is brought into contact with a calibration tool in order to draw air from the calibration tool, the pressure in the calibration tool being regulated to a target value by means of a control valve.

2. The Prior Art

An extrusion line for producing plastic profiles usually consists of an extruder with an extrusion die that is adjoined with calibration tools for calibrating and cooling the produced profile. Directly downstream of the extrusion die, what are termed dry calibration tools are mostly utilized, these generally being water-cooled metal blocs having a calibration port that conforms to the outer contour of the profile and that is laterally adjoined with vacuum slots. The vacuum slots communicate with vacuum pumps for pressing the profile against the wall of the calibration channel so that through intimate contact of the still soft profile with the wall of the calibration channel the profile be reliably formed into the desired shape on the one side and good heat transfer and, as a result thereof, fast cooling be achieved on the other side. The dry calibration tools are adjoined with calibration baths, which are vessels in which the now at least partially solidified profile is further cooled through direct contact with a coolant, calibration screens for guiding and keeping the profile dimensionally stable being disposed in said vessels. A negative pressure is also created in the vessels in order to ensure secure contact of the profile with the calibration screens. Such a solution is described in EP 0 659 536 A issued to the applicant of the present application.

Usually, each calibration tool is connected to one or a plurality of vacuum pumps in order to create the necessary negative pressure. The vacuum pumps must thereby be devised for maximum need which is obtained from the starting state, i.e., at production start, when the outer contour of the profile must for the first time be drawn to the tool's surface. The disadvantage thereof is that, in most of the operating conditions of the vacuum pumps, the vacuum produced is too high and has to be reduced in order to prevent damage to the profile. As vacuum pumps are generally very difficult to regulate, the pressure increase, i.e., the reduction of the negative pressure, on known tools is generally achieved by providing a control valve through which a vacuum chamber of the tool is in communication with the environment. When the pressure in the tool drops below a certain target value, the control valve opens to supply secondary air thus to keep the pressure within the desired range. Regulation may thereby be performed either automatically or manually. Such type solutions are disclosed in DE 33 01 556 C and in JP 05 131 525 A.

Although the method described permits to keep the pressure within a tool on a predetermined level, the energy expense is quite high. In modern calibration tools most of the energy required is used for supplying the vacuum.

It is the object of the present invention to reduce energy expense and to indicate a method of regulating the pressure by which significant energy savings are achieved without adding to the expense of the apparatus.

It is another object of the present invention to increase the accuracy with which the negative pressure is set in the discrete calibration tools in order to thus increase the quality of the profile produced.

SUMMARY OF THE INVENTION

In accordance with the invention, these objects are achieved in that a plurality of vacuum pumps draw air from a common pressure tank and that the air is drawn from at least one dry calibration tool through a first control valve into the common pressure tank and that further the air is drawn from at least one calibration bath through a second control valve into the common pressure tank. The important point of the present invention is that the pressure in the discrete calibration tools is not regulated by supplying secondary air from the environment, but that pressure regulation is performed in the flow path between the calibration tool and the vacuum pumps. Another substantial aspect of the method of the invention is that the discrete vacuum pumps are not connected to discrete tools but that a common pressure tank is mounted between the vacuum pumps and the tools. The different pressure levels needed for the discrete calibration tools are set by the control valves that are disposed between the common pressure tank and the discrete calibration tools. Thus, the vacuum pumps need only yield the output required to maintain the vacuum, said output being dictated for the major part by the unavoidable secondary air flows at the entrance and exit cross sections of the profile.

Another advantage of the method of the invention is that the negative pressure in the calibration tools is regulatable with less variation so that the quality of the profiles produced can be increased.

Pressure regulation in the dry calibration tool can more specifically be substantially simplified by having the air drawn from the dry calibration tool through a first water separator mounted upstream of the first control valve. The water separator thereby serves not only to separate the water or coolant drawn together with the air but also as a buffer store that accommodates too fast pressure variations and prevents them from occurring. Likewise, it is preferred to have air drawn from the calibration bath through a second water separator that is mounted upstream of the second control valve.

A particularly energy-saving and low-cost variant of the method of the invention is obtained in that a plurality of vacuum pumps are connected to the common pressure tank and that pressure regulation in the common pressure tank is performed by respectively switching discrete vacuum pumps on and off. Each vacuum pump can thus always operate in the optimal operating point. If the permissible pressure exceeds an upper limit, an additional vacuum pump is switched on and in reverse, if the pressure drops below a lower limit, a vacuum pump is switched off in order to maintain the pressure in the common pressure tank within the permissible range. The pressure in the common pressure tank is thereby preferably set so as to allow sufficient supply to the tool requiring the highest amount of vacuum. It is therefore provided that pressure regulation in the common pressure tank starts from a target value that either corresponds to the minimum value of the pressure to be set in the discrete calibration tools or slightly falls below said minimum value.

The invention further relates to a device for regulating the vacuum supply of calibration tools, said device including at least one dry calibration tool and at least one calibration bath, with at least one vacuum pump and with at least one control valve. The device of the invention is characterized in that there is provided a common pressure tank that is connected to at least one dry calibration tool through a first control valve and that is connected to at least one calibration bath through a second control valve. As already explained herein above, it is essential for the invention that the control valves are not provided between the calibration tools and the environment but between the calibration tools and the common pressure tank.

In terms of energy, it is preferred that on the air side the dry calibration tool communicates with the common pressure tank only and that on the air side the calibration bath communicates with the common pressure tank only. This permits to largely prevent energy losses through the control valves. A particularly advantageous operating behaviour can be achieved in that the common pressure tank preferably comprises at least one volume that corresponds to the nominal pump capacity of all of the vacuum pumps of one to five seconds at the pressure target value of the common pressure tank. This more specifically permits to keep the pressure variations within narrow limits by alternately switching discrete vacuum pumps on and off. In this context, a number of between three and five pumps introduces a greater effect of benefit. A sufficiently fine gradation in the total output energy of the vacuum pumps is thus ensured at a reasonable expense in terms of apparatus.

The invention will be explained in further detail herein after with reference to the exemplary embodiment illustrated in the FIGURE.

BRIEF DESCRIPTION OF THE FIGURE

The FIGURE is a schematic view of a device of the invention used in an extrusion line.

DETAILED DESCRIPTION OF THE PREFERRED EMBODIMENT

In the FIGURE, the extrusion line consists of an extruder 1 with an extrusion die 2 for producing a plastic profile 3. The plastic profile 3 is cooled and calibrated in a first dry calibration tool 4a. Downstream of the first dry calibration tool 4a there is disposed another dry calibration tool 4b that is adjoined downstream thereof with a calibration bath 5a having a plurality of screens 6 that may in turn be adjoined with further calibration baths like for example in the present exemplary embodiment the additional calibration bath 5b. A caterpillar draw-off unit 7, which is schematically illustrated herein, serves to apply to the profile 3 the tensile force required.

The dry calibration tools 4a, 4b communicate with a first water separator 9 through vacuum lines 8a, 8b. In the same manner, the calibration baths 5a, 5b are connected to a second water separator 11 through vacuum lines 10a, 10b.

The water separators 9, 11 serve to separate a coolant that has possibly been swept along with the drawn air in order to prevent performance losses of the vacuum pumps and failures of the control valves because of coolant that has been swept along. Another function of the water separators is to act as buffer containers that are capable of absorbing and accommodating pressure variations in order to improve regulating behaviour.

The water separators 9, 11 each communicate with a common pressure tank 16 through a suction line 12, 14. In each of the suction lines 12, 14 there is provided a pressure control valve 13, 15 that permits to set the pressure in the water separators 9, 11 largely independent of the pressure in the common pressure tank 16. Overall, four vacuum pumps 17a, 17b, 17c, 17d are connected to the pressure tank 16 so that the required negative pressure can be built up in the common pressure tank. The vacuum pumps 17a, 17b, 17c, 17d communicate with a control system 19 through control lines 18. Pressure sensors 20, 22 are further provided in the water separators 9, 11, each said pressure sensors communicating through signal lines 21, 23 with said control system 19. Another pressure sensor 24 detects the pressure in the common pressure tank 16 and also communicates with the control system 19 through a signal line 25. The control valves 13, 15 are also actuated by the control system 19 through control lines 26, 27.

Furthermore, different negative pressures may be realized in the dry calibration tools 4a, 4b by means of additional control valves 30a, 3b and the associated control lines 32a, 32b. Different negative pressures may also be created in the calibration bath 5a, 5b by means of additional control valves 31a, 31b and control lines 33a, 33b.

By means of the water pumps 28a and 28b, which communicate with the control unit 19 through control lines 29a and 29b, separated coolant is drawn from the water separators 9 and 11 into a central water tank 36 or into a coolant return channel and is delivered by means of delivery lines 35a and 35b.

Coolant of the vacuum pumps 17a through 17d, which has been swept along, is also supplied to the central water tank 36 or into a coolant return channel by means of delivery lines 34a through 34d.

Fresh coolant is fed through a delivery line 37; excess coolant is evacuated via a discharge line 38. A coolant pump 39 delivers coolant from the coolant tank 36 to the dry calibres 4a, 4b and to the cooling troughs of the calibration baths 5a, 5b by means of the suction line 40a and the pressure line 40b.

Herein after, operation of the device of the invention will be explained in further detail with reference to the exemplary embodiment illustrated. In order to achieve optimal extrusion process resulting in the best possible quality of the profile, it is necessary to set in the calibration tools 4a, 4b; 5 a predetermined negative pressure with the greatest possible accuracy. The negative pressure of the dry calibration tools 4a, 4b generally is of about 0.15 bar absolute and that of the calibration tank of about 0.8 bar absolute.

These values are mere rough approximate values though since the exact values depend on a plurality of parameters such as kind and size of the profile, extrusion speed, type of the tool and the like. Initially, those skilled in the art may roughly estimate the pressures needed and may then, at a later stage, more accurately determine them by performing tests when adjusting the tool. In the exemplary embodiment illustrated in the FIGURE it is assumed that the two dry calibration tools 4a, 4b are connected to a common water separator 9 and that the same negative pressure is accordingly applied to both of them. If, in particular cases, the two dry calibration tools 4a, 4b have to be regulated separately, this may be readily realized by allocating each dry calibration tool 4a, 4b its own water separator with its own control valve. Likewise, there may be provided a plurality of calibration baths 5 that are also implemented to be regulatable either together or separately.

In the control system 19, a target value for the pressure in the common pressure tank 16 is dictated, said target value corresponding to the lowest pressure that is required in one of the calibration tools 4a, 4b; 5 or slightly falling below this pressure, that is to say by 0.01 bar for example. To build up this pressure, all of the vacuum pumps 17a, 17b, 17c, 17d are actuated in the first place, with part of them being switched off when the pressure level has been attained. After that, the pressure level is kept within the range of the target value by switching discrete vacuum pumps 17a, 17b, 17c, 17d respectively on and off. Part-load operation of the vacuum pumps 17a, 17b, 17c, 17d can thus be avoided. Through the control valves 13, 15, the pressure in the water separators 9, 11 and, as a result thereof, in the calibration tools 4a, 4b; 5 can be kept within the range of the target values dictated by an operator or by another control system. The control valves 13, 15 may also be actuated manually in specific cases when the need arises. The important point is that no control valves or the like, which selectively supply secondary air, are provided on the calibration tools 4a, 4b; 5.

The present invention permits to reduce the energy consumption of extrusion lines by considerably reducing the expense of providing a vacuum. Further, the method of the invention and the device of the invention permit to achieve a more accurate regulation of the negative pressure in the calibration tools.

The invention claimed is:

1. A method for regulating the vacuum supply of calibration tools, said tools comprising at least one dry calibration tool and at least one calibration bath, by which at least one vacuum pump is brought into contact with a calibration tool in order to draw air from the calibration tool, the pressure in said calibration tool being regulated to a target value by means of a control valve, wherein a plurality of vacuum pumps draw air from a common pressure tank and wherein the air is drawn from at least one dry calibration tool through a first control valve into the common pressure tank, and wherein further the air is drawn from at least one calibration bath through a second control valve into the common pressure tank.

2. The method according to claim 1, wherein the air is drawn from the dry calibration tool through a first water separator mounted upstream of the first control valve.

3. The method according to claim 1, wherein the air is drawn from the calibration bath through a second water separator mounted upstream of the second control valve.

4. The method according to claim 1, wherein a plurality of vacuum pumps are connected to the common pressure tank and wherein pressure regulation in the common pressure tank is performed by respectively switching discrete vacuum pumps on and off.

5. The method according to claim 4, wherein pressure regulation in the common pressure tank starts from a target value that either corresponds to the minimum value of the pressure to be set in the discrete calibration tools or slightly falls below said minimum value.

6. A device for regulating the vacuum supply of calibration tools, said device including at least one dry calibration tool and at least one calibration bath, a common pressure tank that is connected to at least one dry calibration tool through a first control valve and that is connected to at least one calibration bath through a second control valve, said device further including with at least one vacuum pump which is connected to the common pressure tank and with at least one control valve, and including a common pressure tank that is connected to at least one dry calibration tool through a first control valve and is connected to at least one calibration bath through a second control valve.

7. The device according to claim 6, including a first water separator upstream of the first control valve.

8. The device according to claim 6, including a second water separator upstream of the second control valve.

9. The device according to claim 6, wherein on the air side the dry calibration tool communicates with the common pressure tank only.

10. The device according to claim 6, wherein on the air side the calibration bath communicates with the common pressure tank only.

11. The device according to claim 6, wherein the common pressure tank comprises at least one volume that corresponds to the nominal pump capacity of all of the vacuum pumps of one to five seconds at the pressure target value of the common pressure tank.

12. The device according to claim 6, including between three and five vacuum pumps.

13. The device according to claim 6, including a plurality of vacuum pumps mounted in parallel with the common pressure tank.

14. The device according to claim 13, including a control system that regulates the pressure in the common pressure tank by switching discrete vacuum pumps on and off.

* * * * *